United States Patent [19]

Tax et al.

[11] 4,016,993

[45] Apr. 12, 1977

[54] LOAD CLAMPING APPARATUS

[75] Inventors: Hans Tax; Dieter Bauer, both of Munich, Germany

[73] Assignee: Hans Tax, Munich, Germany

[22] Filed: Mar. 18, 1976

[21] Appl. No.: 668,290

[30] Foreign Application Priority Data

Mar. 24, 1975 Germany .......................... 2512927

[52] U.S. Cl. ........................... 214/394; 294/67 BB; 294/67 BC

[51] Int. Cl.² ........................ B60P 3/00; B66C 3/16

[58] Field of Search ................. 214/390, 39 R, 394, 214/396; 212/11, 14, 127, 129, 140–142; 294/67 R, 67 BB, 67 BC, 88, 103 R, 104, 116

[56] References Cited

UNITED STATES PATENTS

| | | | |
|---|---|---|---|
| 1,777,019 | 9/1930 | Samuelson | 214/392 |
| 3,959,310 | 11/1960 | Meister | 214/392 |

*Primary Examiner*—Robert G. Sheridan
*Attorney, Agent, or Firm*—Hans Berman

[57] ABSTRACT

A transporter for red hot steel ingots has two pairs of jaws horizontally movable relative to each other along a carrier bar. A hanger pivotally mounted on one jaw and carrying a gripper pad may be swung toward the other jaw by a separate clamping drive. The momentum exerted on the jaws by the engaged ingot causes sufficient angular displacement of the jaws to tilt them into jamming engagement with the carrier bar, thereby blocking longitudinal jaw movement on the bar.

6 Claims, 5 Drawing Figures

Fig. 3
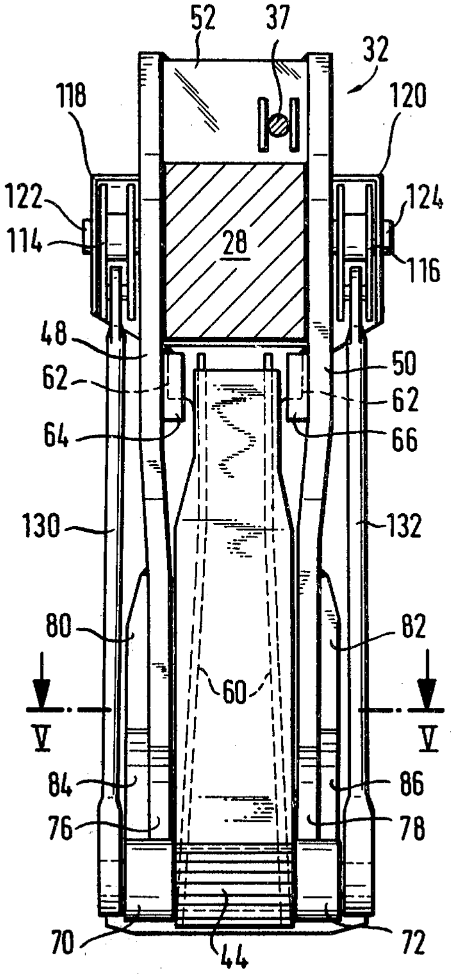
Fig. 4
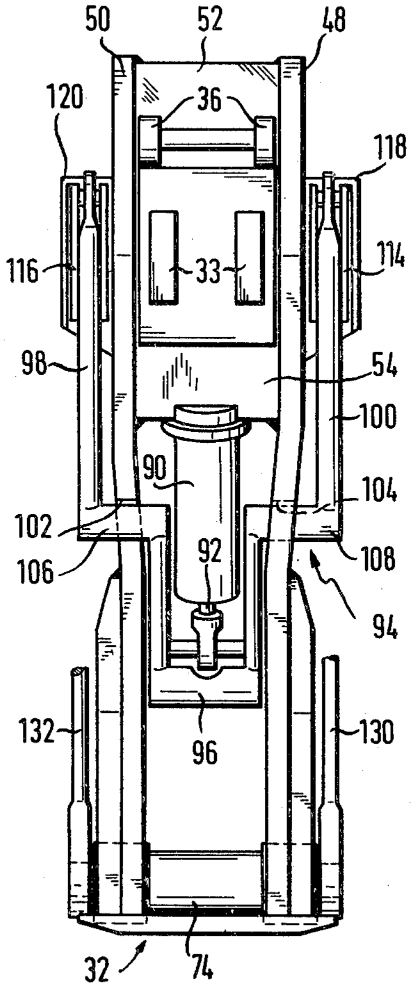
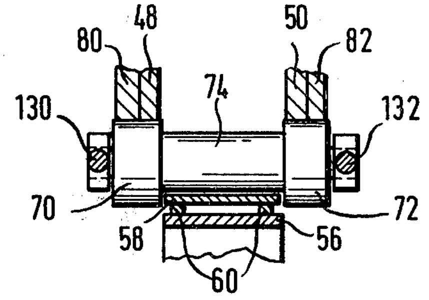
Fig. 5

LOAD CLAMPING APPARATUS

This invention relates to load clamping apparatus, and particularly to apparatus for gripping a heavy load, such as a red hot steel ingot, which is to be lifted and/or transported horizontally.

While the invention will be described hereinbelow with reference to a transporter for carrying ingots between two locations in a steel mill, it is not limited to the specific, illustrative application but is generally useful wherever a load is not readily gripped by crane hooks and similar load engaging devices, and has to be handled by means of tongues or like clamping devices.

It is a primary object of this invention to provide load clamping apparatus which is relatively simple and inexpensive and is capable of clamping loads widely varying in their dimensions under high clamping pressure.

With this object and others in view, as will hereinafter become apparent, the clamping apparatus of the invention provides an elongated carrier and two clamping jaws spaced longitudinally of the carrier. At least one jaw is guided longitudinally of the carrier and for angular movement about an axis transverse to the direction of carrier elongation. Cooperating elements on the carrier and the one jaw respond to such angular movement by blocking longitudinal jaw movement. A portion of the one jaw spaced from the afore-mentioned axis carries a first load gripping device which faces a second load gripping device on the other jaw. Separate drives are provided for longitudinally moving at least the one jaw and for moving the first load gripping device on the one jaw toward the second load gripping device. When a load is gripped between the two devices, at least the one jaw is angularly moved about said axis by the momentum exerted by a gripped load, so that the jaw is blocked in a fixed longitudinal position on the carrier.

Other features, additional objects, and many of the attendant advantages of this invention will readily be appreciated as the same becomes better understood from the following detailed description of a preferred embodiment when considered in connection with the appended drawing in which:

FIG. 3 is a left, side-elevational section of the device of FIG. 2 taken on the line III — III;

FIG. 4 shows the device of FIG. 2 in right side elevation as indicated by the arrow IV; and FIG. 5 shows elements of the device of FIG. 2 in plane section on the line V — V in FIG. 3.

Figure 1:
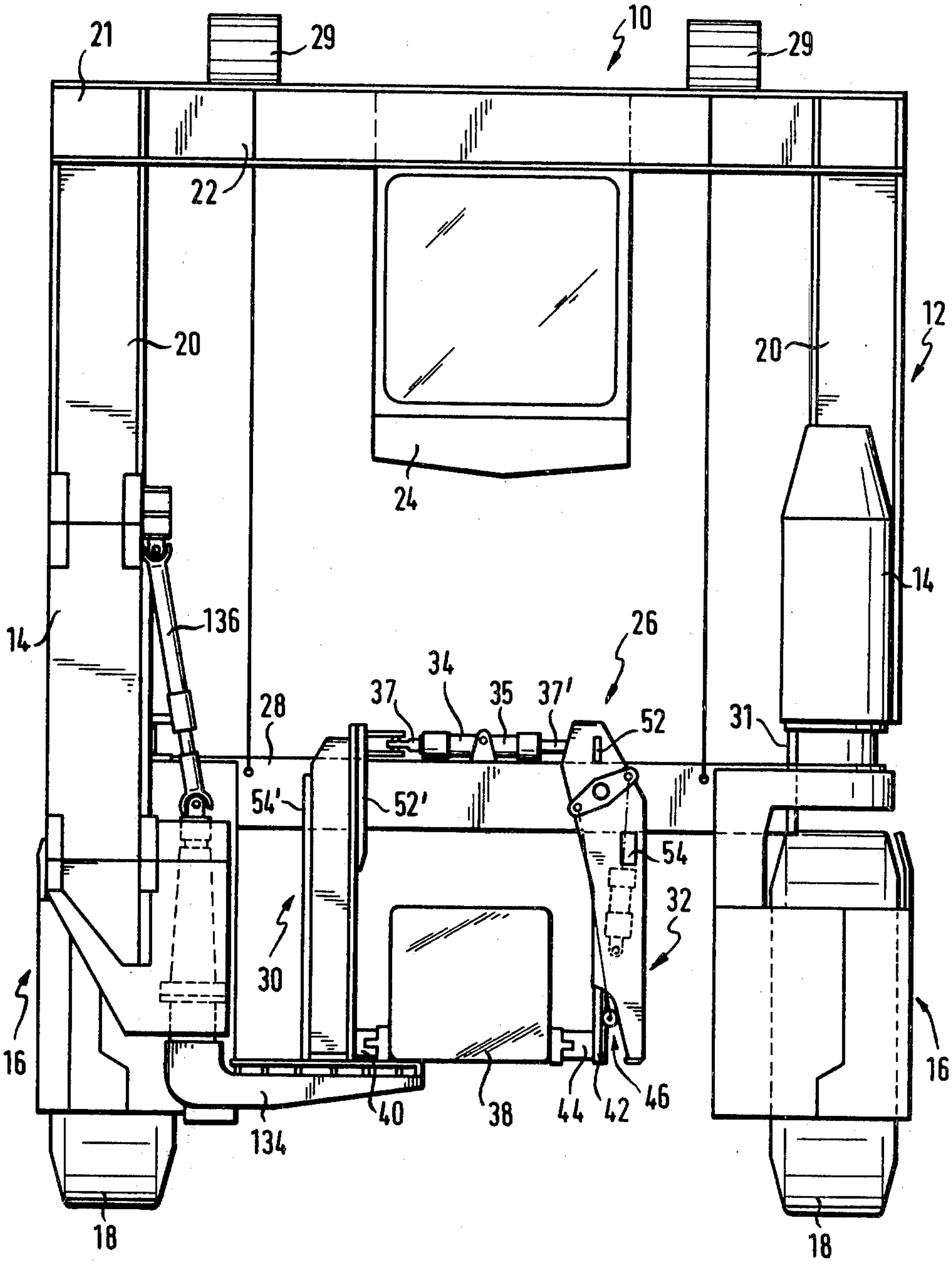
FIG. 1 shows an ingot transporter of the invention in front elevation.

Referring now to the drawing in detail, and initially to FIG. 1, there is shown an ingot transporter 10 for a steel mill. The supporting frame 12 of the transporter has the approximate cross-sectional shape of an inverted U. Two heavy, spacedly parallel, horizontal beams 14 constitute the base of the frame. Four trucks 16 depend from the beams 14 at the four bottom corners of the frame 12 and may be turned individually about vertical axes, each truck 16 having three wheels 18 driven by individual motors. Only two trucks 16 and one wheel 18 of each truck are shown in the drawing. The top ends of upright lattice beams 20 spaced along each base beam 14 are connected horizontally by longitudinal lattice beams 21 and transverse lattice beams 22 in a manner only partly illustrated in FIG. 1. An operator's cab 24 depends from the beams 22. The elements of the transporter 10 described so far may be conventional.

This invention is more particularly concerned with two identical load clamping devices 26 of which only one is shown in the drawing, the other clamping device being horizontally aligned with the illustrated clamping apparatus in the direction of elongation of the frame 12. A carrier bar 28 is suspended from an overhead beam 22 by means of two chain winches 29 and may be raised and lowered along guide rails 31 on the base beams 14. Two clamping jaws 30, 32 may be moved toward and away from each other along the carrier bar 28 by respective hydraulic motors whose cylinders 34, 35 are pivotally attached to the central portion of the bar 28, the piston rods 37, 37′ being fastened to the two jaws 30, 32.

Each end of an ingot 38 is clamped between a gripping pad 40 fixedly mounted on the jaw 30 and a similar pad 44 mounted on a hanger 42 movably attached to the jaw 32 and held in clamping engagement with the ingot 38 by a cam mechanism 46 presently to be described in more detail. The bar 28 normally passes through the jaw 32 with some clearance between two webs 52, 54 offset longitudinally of the bar 28. The momentum exerted by the gripped ingot 38 on the jaw 32 tilts the jaw so that the webs 52, 54 are jammed against the cooperating horizontal faces of the bar 28 and block movement of the loaded jaw 32 relative to the bar 28. The jaw 30 is similarly blocked in the illustrated condition by engagement of apertured vertical walls 52′, 54′ with the bar 28. The cylinders 34, 35 need not be under fluid pressure to secure the jaws 30, 32 on the bar 28.

L-shaped brackets 134 are spaced along the base beam 14 near the jaw 30 and may be pivoted on the associated beam 14 about vertical axes by driven shafts 136 toward and away from the illustrated operative position in which their horizontal legs extend under the jaws 30 of the two clamping devices 26 and the ingot 38 for additional safety of operation.

To transfer a hot ingot between two locations in the steel mill, the transporter 10 with its raised jaws 30, 32 spaced widely apart is driven into a position in which it straddles the ingot, and the ingot is centered between the two pairs of clamping jaws. The clamping devices are lowered and the jaws are moved toward each other until they touch the ingot. The hanger 42 is then moved to grip the ingot between the pads 40, 44, thereby simultaneously blocking the jaws 30, 32 on the bar 28. The clamping devices 26 are raised by the winches 29 together with the ingot, the brackets 134 are swung into the operative position, and the transporter 10 is driven to a desired location where it is unloaded by reversing the sequence of operations outlined above.

The jaw 32 and the associated cam mechanism 46 are shown in more detail in FIGS. 2 to 5 together with a portion of the bar 28 from which slides 33 project for guiding engagement by the rails 31. The jaw 32 has vertically elongated front and rear plates 50, 48 which slidably receive the bar 28 therebetween and are connected by the afore-mentioned webs 52, 54. The hanger 42 consists mainly of two flat bars 56, 58 connected by welded spacer rods 60. Two lateral arms 62 at the top end of the bar 58 constitute fulcrum elements of a pivot assembly including notched bearing plates 64, 66 welded to the front and rear plates 48, 50 respectively.

Narrow, spacedly parallel edge faces 76, 78 of the plates 48, 50 are flush with corresponding edge faces 84, 86 of reinforcing plates 80, 82 welded to the lower portions of the plates 48, 50. The paired faces 76, 78, 84, 86 provide two cam tracks for a cam follower assembly including three rollers 70, 72, 74 coaxially rotatable on a common shaft 68. As is best seen in FIG. 5, the two identical outer rollers 70, 72 travel on the two cam tracks respectively and are axially spaced to receive the plate 58 of the hanger 42 therebetween. A face of the latter provides a third cam track for the central roller 74 whose diameter is smaller than that of the outer rollers.

When the clamping device 26 is idle, the jaw 32 depends from a single guide roller 36 journaled between the plates 48, 50 and traveling on the horizontal top surface of the rectangular bar 28. The roller 36 also provides a pivot about which the jaw 32 as a whole may be swung by the momentum of the clampingly engaged ingot 38 as described above, whereupon the weight of the jaw 32 and a corresponding portion of the ingot weight is transmitted to the bar 28 mainly by the web 52.

A second hydraulic motor 88 associated with the jaw 32 is mounted between the two plates 48, 50. The imperforate bottom of its cylinder 90 is welded to the bottom face of the web 54, and its downwardly projecting piston rod 92 is connected to the shaft 68 of the cam follower rollers 70, 72, 74 by a motion transmitting train 94 including a fork 96. Short bars 106, 108 extend horizontally from the two free ends of the fork 96 through openings 102, 104 of the plates 48, 50 fixedly to connect the fork to two pull rods 98, 100. Rockers 114, 116 are mounted on pivot pins 122, 124 between the outer faces of the plates 48, 50 and brackets 118, 120 attached to the plates. Respective first arms of the rockers 114, 116 are hingedly attached to the pull rods 98, 100 while the second arms are hinged to connecting rods 130, 132 whose free ends are connected by the shaft 67.

Figure 2:
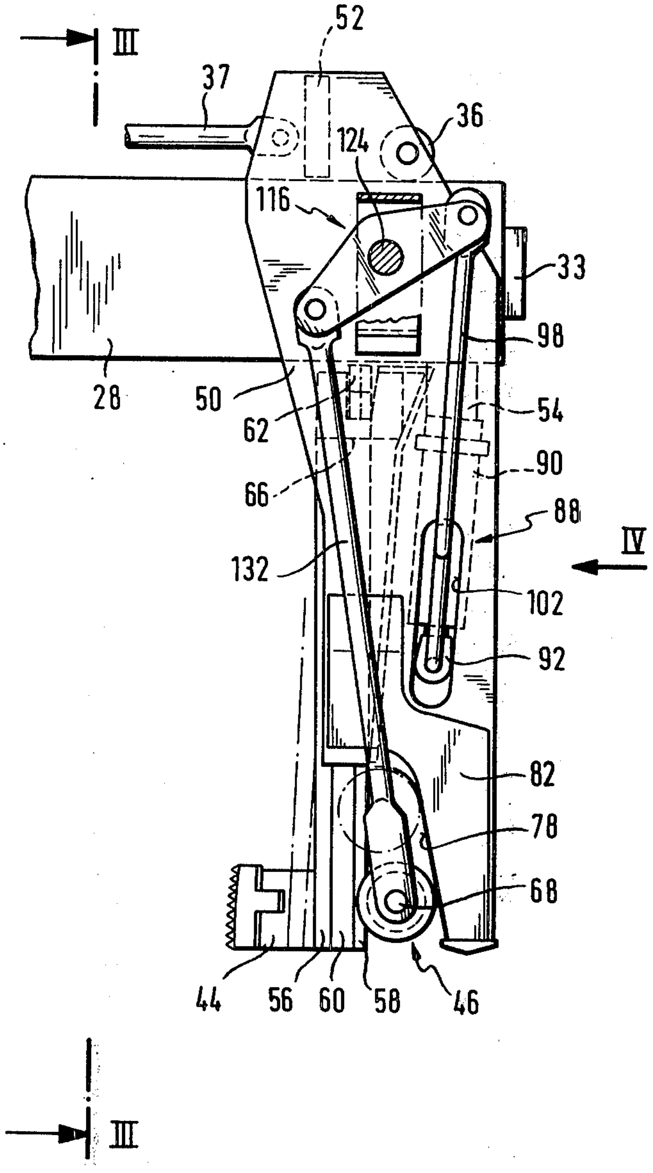
FIG. 2 illustrates a portion of the apparatus of FIG. 1 on a larger scale.

When the piston rod 92 is fully retracted into the cylinder 90, so that the overall length of the hydraulic motor 88 is at its minimum, the hanger 42 is pivoted by gravity into the rest position shown in fully drawn lines in FIG. 2. The shaft 68 and the associated cam follower rollers are in their lowest position between the cam tracks on the hanger 42 and on the plates of the jaw 32 which obliquely converge in an upward direction. When hydraulic fluid drives the piston rod 92 out of the cylinder 90, the rockers 114, 116 turn clockwise, as viewed in FIG. 2, and the connecting rods 130, 132 shift the cam follower rollers upward toward the position shown in broken lines, thereby enlarging the angle of inclination between the cam tracks and swinging the hanger 42 clockwise on the arms 62 and bearing plates 64, 66 into the clamping position shown in broken lines. If the clamping pad 44 engages a load when fluid is admitted to the cylinder 90, the momentum exerted by the clamped load tilts the jaw 32 with all devices supported thereon in a counterclockwise direction. The clamping force of the hydraulic motor 88 is amplified by the camming cooperation of the rollers 70, 72, 74 with the engaged cam tracks.

The hydraulic motors 34, 35 shifting the jaws 30, 32 along the bar 28 merely position the jaws 30, 32 in a position of readiness for clamping the load, but do not participate in the clamping action proper. Therefore, they may be dimensioned only for overcoming the relatively insignificant friction forces impeding movement of the jaws along the carrier bar 28 for adjusting the clamping device 26 to the gross dimensions of the load. The relatively heavy motor 88 is used only during the very short clamping stroke of the pad 44. The two hydraulic motors thus use operating energy and materials of construction to best advantage.

The motion transmitting train 94 permits the power stroke of the motor 88 to be performed while the overall length of the motor is being increased, and the piston rod 92 is stressed in compression, as is advantageous in such motors. It is free from significant stresses while the pad 44 is retracted from a released load by reversing the flow of hydraulic fluid to and from the cylinder 90.

The hydraulic and electric systems and their control elements which permit an operator in the cab 24 to steer the trucks 16, to energize the non-illustrated motors of the wheels 18, to admit hydraulic fluid to the cylinders 34, 35, 90 and to release such fluid, and to turn the shafts 136 will be obvious to those skilled in this art and have been omitted together with the thermal shielding which protects them against heat radiated from the ingot 38 in order not to crowd the drawing.

The illustrated transporter 10 has two transversely movable jaws 30, 32 and is thus readily adapted to carrying loads of greatly varying transverse dimensions. However, the jaw 30 may be mounted in a fixed position on the bar 28 without losing all the major advantages of this invention.

It should be understood, therefore, that the foregoing disclosure relates only to a presently preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. Clamping apparatus comprising:

a. an elongated carrier;

b. two clamping jaws spaced longitudinally of said carrier;

c. guide means on one of said jaws engaging said carrier for guiding longitudinal movement of said one jaw relative to said carrier and angular movement of said one jaw about an axis transverse to the direction of elongation of said carrier;

d. cooperating blocking means on said carrier and on said one jaw for blocking said longitudinal movement of said one jaw in response to said angular movement of said one jaw;

e. first load gripping means mounted on a portion of said one jaw spaced from said axis;

f. second load gripping means on the other jaw, said first and second load gripping means facing each other for gripping a load therebetween;

g. first drive means for actuating said longitudinal movement of said one jaw; and h. second drive means for moving said first load gripping means on said one jaw toward said second load gripping means and for thereby angularly moving said one jaw about said axis in response to engagement of said first load gripping means with said load.

2. Apparatus as set forth in claim 1, wherein said drive means include respective separate drive motors.

3. Apparatus as set forth in claim 2, further comprising a hanger member mounted on said one jaw for pivoting movement between a rest position and a clamping position, said one jaw and said hanger member having respective cam faces obliquely inclined relative to each other in said rest position of the hanger member, said first gripping means including a gripping member mounted on said hanger member for movement toward said second gripping means when said hanger member moves from said rest position toward said clamping position, and said second drive means including cam follower means drivingly connected to said motor of said second drive means for movement in simultaneous engagement with said cam faces and for thereby increasing the angle of relative inclination of said cam faces.

4. Apparatus as set forth in claim 3, wherein said cam follower means include three rollers coaxially juxtaposed on a common shaft for engagement of the two axially outer rollers with one of said cam faces while the central roller engages the other cam face.

5. Apparatus as set forth in claim 3, wherein the drive motor of said second drive means includes a hydraulic cylinder and a piston rod movably projecting from said cylinder, said cylinder and piston rod jointly defining the axial length of said drive motor, said second drive means further comprising motion transmitting means connecting said motor thereof to said cam follower means, said axial length increasing when said angle of relative inclination is increased by driven movement of said cam follower means.

6. Apparatus as set forth in claim 1, further comprising a support, a set of wheels arranged on said support for rolling engagement with a horizontal surface while said support moves parallel to said surface, and lifting means on said support connected to said carrier for raising and lowering said carrier relative to said surface while the direction of elongation of said carrier is substantially parallel to said surface.

* * * * *